(12) United States Patent
Fuchs et al.

(10) Patent No.: US 12,119,690 B2
(45) Date of Patent: Oct. 15, 2024

(54) CHARGER AND CHARGER HOUSING WITH WATER DISCHARGE STRUCTURE

(71) Applicant: Andreas Stihl AG & Co. KG, Waiblingen (DE)

(72) Inventors: Michael Fuchs, Waiblingen (DE); Charis Hellmann, Korntal-Muenchingen (DE); Benedikt Lang, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 333 days.

(21) Appl. No.: 17/644,199

(22) Filed: Dec. 14, 2021

(65) Prior Publication Data

US 2022/0190610 A1     Jun. 16, 2022

(30) Foreign Application Priority Data

Dec. 15, 2020 (EP) .................................... 20214342

(51) Int. Cl.
*H01M 10/46* (2006.01)
*H01M 50/247* (2021.01)
(Continued)

(52) U.S. Cl.
CPC ......... *H02J 7/0044* (2013.01); *H01M 50/247* (2021.01); *H01M 50/691* (2021.01); *H01M 2220/30* (2013.01)

(58) Field of Classification Search
CPC .... H02J 7/0044; H02J 7/0042; H01M 50/691; H01M 50/247; H01M 2220/30
(Continued)

(56) References Cited

U.S. PATENT DOCUMENTS 6,982,541 B2   1/2006   Zick et al.
9,634,503 B2   4/2017   Taga et al.
(Continued)

FOREIGN PATENT DOCUMENTS

CN         104380562 A  *  2/2015  ............ H01M 10/46
DE    10 2015 002 313 A1    8/2015
(Continued)

OTHER PUBLICATIONS

German-language European Search Report issued in European Application No. 20214342.6 dated May 27, 2021 with partial English translation (nine (9) pages).

*Primary Examiner* — Edward Tso
(74) *Attorney, Agent, or Firm* — Crowell & Moring LLP

(57) ABSTRACT

A charger and charger housing have a water discharge structure. The charger housing includes an operating side, having at least one battery charging space, which is accessible from the operating side, and a first housing outer wall region on a first housing side. The first housing side forms, in a first use position of the charger housing, a bottom side thereof. A water discharge structure discharges water out of the charger housing, wherein the water discharge structure has at least one first water outlet opening in the first housing outer wall region. The charger includes a second housing outer wall region on a second housing side, the second housing side being non-parallel to the first housing side and forming, in a second use position of the charger housing, a bottom side thereof. The water discharge structure has at least one second water outlet opening in the second housing side. Use may be in chargers for electrical charging of battery packs for hand-guided motor-operated tools in gardening and forestry.

9 Claims, 6 Drawing Sheets

(51) Int. Cl.
*H01M 50/691* (2021.01)
*H02J 7/00* (2006.01)

(58) Field of Classification Search
USPC .............. 320/107, 112, 113, 114, 115, 150
See application file for complete search history.

(56) References Cited

U.S. PATENT DOCUMENTS

| | | |
|---|---|---|
| 9,906,055 B2 | 2/2018 | Taga et al. |
| 9,917,452 B2 | 3/2018 | Kishima et al. |
| 2013/0328523 A1 | 12/2013 | Ota et al. |
| 2017/0294787 A1 | 10/2017 | Taga |
| 2019/0334359 A1 | 10/2019 | Asai et al. |

FOREIGN PATENT DOCUMENTS

| | | |
|---|---|---|
| EP | 1 315 266 A2 | 5/2003 |
| EP | 2 866 324 A1 | 4/2015 |
| EP | 2 824 795 B1 | 5/2018 |
| JP | 2009-178011 A | 8/2009 |
| JP | 2011-200072 A | 10/2011 |

\* cited by examiner

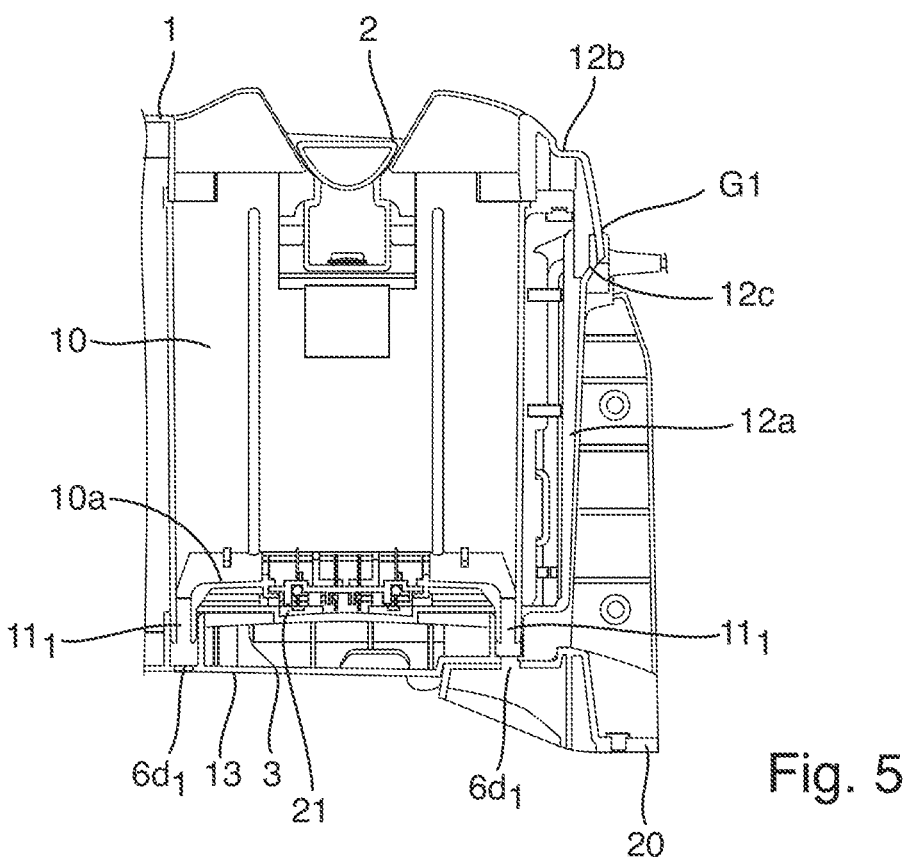
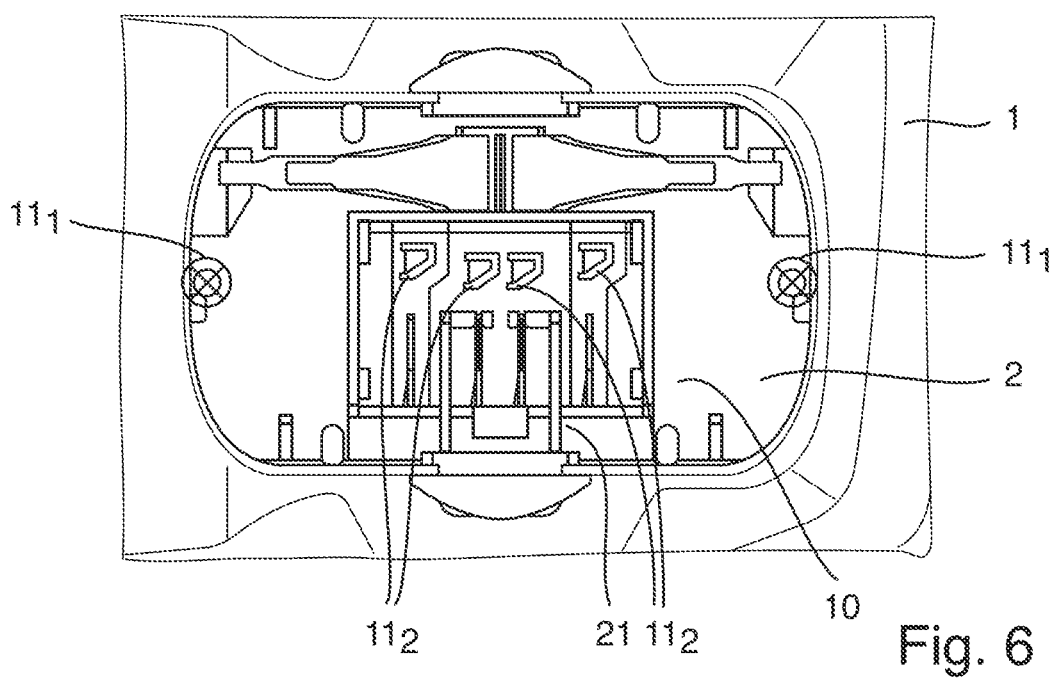

CHARGER AND CHARGER HOUSING WITH WATER DISCHARGE STRUCTURE

CROSS REFERENCE TO RELATED APPLICATION

This application claims priority under 35 U.S.C. § 119 from European Patent Application No. 20214342.6, filed Dec. 15, 2020, the entire disclosure of which is herein expressly incorporated by reference.

BACKGROUND AND SUMMARY OF THE INVENTION

The invention relates to a charger housing comprising an operating side, having at least one battery charging space, which is accessible from the operating side, having a first housing outer wall region on a first housing side, said first housing side forming, in a first use position of the charger housing, a bottom side thereof, and having a water discharge structure for discharge of water out of the charger housing, wherein the water discharge structure has at least one first water outlet opening in the first housing outer wall region, and to a charger provided with such a charger housing.

Such charger housings are used for chargers, more precisely electrical chargers, which serve for charging, that is to say electrically charging, a respective rechargeable electrical battery unit. For this purpose, the respective battery unit is introduced into the battery charging space from the operating side of the charger housing. It can then be removed therefrom again at the operating side of the charger housing, in particular after charging has been realized. The charger may be designed as a single-space charger, which has a single battery charging space, or as a multi-space charger, which has multiple battery charging spaces. In the present case, the expression battery unit comprises an electrical energy storage of any conventional type of battery, in particular of the type of so-called battery packs, as are frequently used for supplying electrical energy for example to electrically operated gardening and forestry tools and to electrically operated DIY (Do It Yourself) tools.

For the operation of the charger, the charger housing thereof is brought into a use position, that is to say into a spatial position in which the charger can be operated according to the intended use, which requires inter alia that the operating side is accessible to the user in order for a battery unit to be introduced into the battery charging space or to be removed from the latter. The use position may consist for example in that the charger housing is set down, and if required fixed, with an associated housing side on a substantially horizontal support, such as a table, a floor in a building or on the ground outdoors, that is to say the respective housing side of the charger housing, or more precisely a region of an outer wall of the charger housing that is on said housing side, contacts the support or faces the latter. Alternatively, as use position, the charger housing may be fixed to a substantially vertical wall, for example of a building or a vehicle, wherein, in this case, the charger housing faces the vertical wall with the same housing side or the same housing outer wall region with which, in the other case, it faces the horizontal support, or alternatively with one of its other housing sides or with another region of the housing outer wall that is situated on this other housing side. Frequently, it is also possible for the charger housing to be used in two or even more different use positions in that it is set down on a horizontal support selectively with in each case one of multiple housing sides or with the respective housing outer wall region.

The water discharge structure serves for removing from the charger housing water which has possibly entered the charger housing or water which has possibly formed in the charger housing, such as condensation water, in order to prevent an excessive amount of water remaining in the charger housing and, there, resulting in damage or causing electrical short circuits. The expression water outlet opening is generally to be understood here as meaning any opening of arbitrary shape and dimensions that allows water to pass through the opening formed in such a way and out of the charging housing. It may in particular be a bore or any other aperture through the corresponding housing outer wall region or be a gap between two typically closely adjacent housing outer wall sections.

For this purpose, for conventional charger housings, it is known to form water outlet openings in a base side, that is to say base wall, of the charger housing, wherein the base side forms that side of the charger housing which is situated at the bottom in the use position of the charger housing, that is to say the charger housing is normally set down on a horizontal support with its base side towards the bottom if the associated charger is to be operated. Such conventional charger housings have been disclosed for example in laid-open publications EP 1 315 266 A2, DE 10 2015 002 313 A1, JP 2011-200072 A and JP 2009-178011 A and also in patent publication EP 2 824 795 B1.

The invention is based on the technical problem of providing a charger housing of the type mentioned at the outset that can be realized with relatively low outlay and that, in comparison with the aforementioned prior art, is improved, in particular with regard to variability of use and protection against moisture, and a charger provided therewith.

The invention solves this problem by providing an inventive-charger housing and a charger having such housing. Advantageous refinements of the invention which contribute to the solution of this and further problems are specified in the dependent claims, the content of which is hereby incorporated in full into the content of the description by way of reference.

The charger housing according to the invention comprises, in addition to the features mentioned at the outset, a second housing outer wall region on a second housing side, said second housing side being non-parallel to the first housing side and forming, in a second use position of the charger housing, a bottom side thereof, wherein the water discharge structure contains at least one second water outlet opening in the second housing outer wall region.

As a result of this characteristic, the charger housing may be used in at least two different use positions, wherein, in each of these use positions, the in each case bottom housing side, more precisely that region of an outer wall of the charger housing which is on said side, has one or more water outlet openings. In this way, in each of these different use positions, that is to say positional orientations of the charger housing in space, during the use of the charger in an operation for charging one or at the same time multiple rechargeable battery units, provision is made such that water which has formed in the housing and/or water which has entered the housing can exit the housing and does not remain in the housing.

In this way, the charger housing can be used in a highly variable and flexible manner, for example by being set down on a substantially horizontal support and optionally being fixed to said support and/or by being attached to a substantially vertical wall, wherein, in each of multiple such different use positions, one or more water outlet openings are situated on the in each case bottom housing side so that water can exit the housing at the bottom side.

The charger according to the invention has such a charger housing according to the invention.

In a refinement of the invention, the first housing outer wall region extends in a concavely descending manner from an elevated first central region to at least one lower-lying first side edge region, preferably to two opposite first side edge regions, and contains at least one of the one or more first water outlet openings in this lower-lying first side edge region. This formation of the respective housing side promotes the removal of water from the housing if the charger housing is in its first use position. This is because this first water outlet opening is then situated at an effectively lowest point or level of the housing, and water can, due to the slope, flow away from the higher first central region to the lower first side edge region(s) and, via the one or more first water outlet openings there, exit the housing. In this way, the corresponding part of the first housing outer wall region forms a water-directing housing surface part of the water discharge structure. In alternative embodiments, the first housing outer wall region extends for example in a planar manner, that is to say the central region is then situated at substantially the same height level as the first side edge regions.

In a development of the invention, the at least one first side edge region has a wall section which is elevated in relation to an adjoining lower-lying wall section, and at least one of the one or more first water outlet openings situated in this first side edge region is formed in a wall section of the charger housing that connects the lower-lying wall section to the elevated wall section. As a result of this measure, the respective water outlet opening is relatively well protected against inadvertent introduction of dirt since it opens out not directly downwardly from the first housing side, which is situated at the bottom in the associated use position of the housing, but transversely thereto in the wall section which connects the lower wall section to the higher wall section and which, in this way, may lie for example substantially in a vertical plane if the first housing outer wall region is oriented substantially horizontally. In alternative embodiments, the respective first water outlet opening is formed for example in the lower wall section.

In a development of the invention, the at least one first side edge region has a grip depression zone with an elevated grip zone section and with a comparatively lower-lying grip zone section, and at least one of the one or more first water outlet openings situated in this first side edge region is formed in the lower-lying grip zone section. This measure advantageously combines a grip function for the respective first side edge region with the arrangement of one or more of the first water outlet openings in the corresponding grip region, that is to say the design of the first side edge region for providing the grip depression zone is at the same time used for suitably forming there the at least one first water outlet opening. In alternative embodiments, the at least one first water outlet opening is situated not in the lower grip zone section but for example in the elevated grip zone section or outside the grip depression zone of the respective first side edge region.

In a refinement of the invention, the battery charging space has a battery compartment housing which is open towards the operating side, and the water discharge structure contains at least one third water outlet opening, which leads out of the battery compartment housing. This measure facilitates removal out of the battery compartment housing of water which has entered the battery compartment housing, for example from the operating side, or which has formed as condensation water in the battery compartment housing.

In a development of the invention, at least one of the one or more third water outlet openings opens out, from a housing side of the battery compartment housing that is opposite the operating side, into a housing interior between the battery compartment housing and the first or the second housing outer wall region or directly into an associated one of the one or more first or second water outlet openings. This makes possible corresponding removal of water from the battery compartment housing on that housing side thereof which is opposite the operating side and out of the charger housing altogether to the outside, the latter process being realized either via a part of the associated housing outer wall region there, as a constituent part of the water discharge structure, or directly via the associated at least one first or second water outlet opening in the first or second housing outer wall region of the charger housing. In cases in which the charger housing is in a use position with the operating side situated at the top, the water can exit the battery compartment housing particularly easily via this third water outlet opening, which is then situated on the bottom side of the battery charging space. In alternative embodiments, the third water outlet opening is situated for example on a housing side of the battery compartment housing that is adjacent to the operating side.

In a refinement of the invention, the second housing outer wall region extends in a convexly descending manner from at least one elevated second side edge region, preferably from two opposite elevated second side edge regions, to a lower-lying second central region, and at least one of the one or more second water outlet openings is formed in the lower-lying second central region. This design of the second housing side, in combination with the formation of the second water outlet opening in the central region of said housing side, promotes the removal of water from the charger housing if the latter is in its second use position in that said second water outlet opening is then situated at an effectively lowest position of the charger housing. In alternative embodiments, the second housing side extends for example in a substantially planar manner, that is to say with a second central region which is situated approximately at the same height level as the second side edge regions.

In a refinement of the invention, the charger housing comprises a two-part housing shell having a base housing shell and having a cover housing shell, which is connected peripherally to said base housing shell, wherein at least one of the one or more second water outlet openings in the second housing outer wall region contains a gap opening between the two housing shells. This measure advantageously combines a shell structure of the charger housing with the formation of said second water outlet opening as a gap opening between the housing shells. In alternative embodiments, the two housing shells are connected to one another in a fluid-tight manner on the second housing side, and the second water outlet opening is formed as an aperture in one and/or the other housing shell. In advantageous embodiments, the operating side on the cover housing shell is alternatively on the base housing shell.

In a development of the invention, multiple second water outlet openings in the second housing outer wall region are formed as a respective gap opening between the two housing shells and spaced apart from one another along a separation line of the two housing shells. This measure promotes reliable removal of water from the charger housing at multiple positions along the preferably peripheral separation line of the two housing shells on the second housing side if the charger housing is in its second use position. Here, for example in the realization with a lower-lying second central region, in each case at least one second water outlet opening may be situated in and outside the second central region.

In a refinement of the invention, the charger housing is cuboidal, wherein a first cuboid side forms the operating side, a second cuboid side, opposite the first cuboid side, forms the first housing side with the first water outlet opening(s), and a third cuboid side, between the first and second cuboid sides, forms the second housing side with the second water outlet opening(s). This constitutes a design of the charger housing that is favourable for many applications, wherein the housing cuboid formed in this way can be used in a highly variable manner. While the first cuboid side functions as the operating side for introduction of battery units to be charged electrically and for removal of charged battery units, the cuboidal housing may selectively be set down or fastened on a horizontal support, or fastened on a vertical wall, by way of its cuboid side situated opposite said first cuboid side or by way of a cuboid side situated therebetween. In alternative embodiments, the charger housing is of a different shape, for example pyramidal or prismatic.

Advantageous embodiments of the invention are illustrated in the drawings. These and further embodiments of the invention will be discussed in more detail below.

BRIEF DESCRIPTION OF THE DRAWINGS

FIG. 5 shows a longitudinal sectional view through a battery compartment housing of the charger housing;

FIG. 6 shows a plan view of the battery compartment housing from an operating side of the charger housing;

DETAILED DESCRIPTION OF THE DRAWINGS

Figure 1:
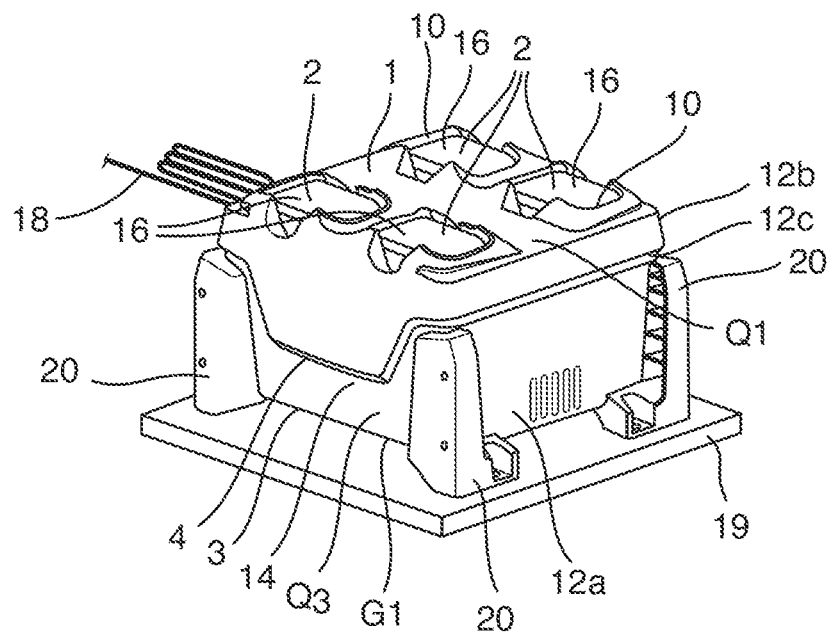
FIG. 1 shows a perspective view of a charger obliquely from above, with a charger housing in a first use position on a substantially horizontal support.

The charger according to the invention, as is shown in an exemplary realization, serves in a manner known per se for electrically charging a rechargeable battery unit, wherein the battery unit may in particular be a battery pack for supplying electrical energy to an electrically operated gardening and forestry tool or to an electrically operated DIY tool.

The charger comprises a charger housing having an operating side 1 and having at least one battery charging space 2, which is accessible from the operating side 1. In the example shown, the charger housing has four battery charging spaces 2, in which in each case one rechargeable battery pack 16 can be received for the purpose of being electrically charged by the charger. The charger can be connected to an electric power supply via a mains cable 18.

Figure 7:
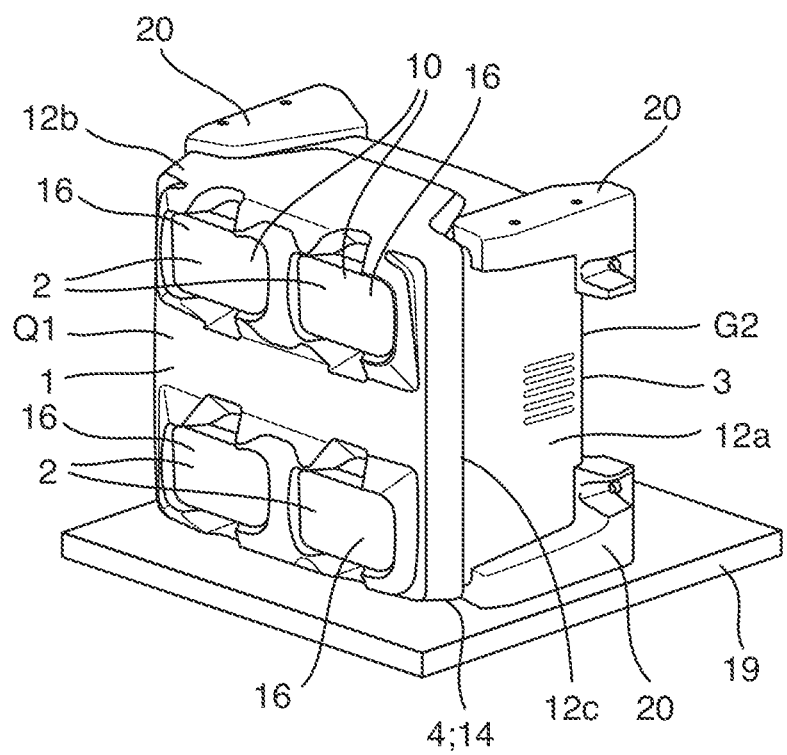
FIG. 7 shows a perspective view obliquely from above of the charger in a second use position on a substantially horizontal support.

The charger housing furthermore comprises a first housing outer wall region 13 on a first housing side 3, said first housing side forming a bottom side of the charger housing in a first use position G1, shown in FIG. 1, of the charger housing, and has a second housing outer wall region 14 on a second housing side 4, said second housing side being non-parallel to the first housing side and forming a bottom side of the charger housing in a second use position G2, shown in FIG. 7, of the charger housing. Specifically, in the example shown, the second housing side 4 extends approximately perpendicularly to the first housing side 3, that is to say, in the second use position G2, the charger housing is oriented tilted by approximately 90° in relation to its first use position G1. Here, in the example shown, the two housing sides 3, 4 or the housing outer wall regions 13, 14 thereof are formed as substantially even side surfaces of the charger housing, wherein, according to requirement, profiled wall structure parts, for example in the form of protruding and/or recessed wall parts, may be present.

In FIGS. 1 and 7, the charger housing is in each case shown situated on an approximately horizontal support 19. In alternative placements, the charger housing may, in each of the two use positions G1, G2, be held on a substantially vertically oriented wall, for example of a building or of a vehicle. For fixing the charger housing in its respective use position G1, G2 to the horizontal support 19 or to a differently oriented support or wall, the charger housing is provided with suitable fastening supports 20 having corresponding fastening elements, such as screw openings arranged at suitable positions.

Furthermore, the charger housing comprises a water discharge structure 5 for discharge of water out of the charger housing, wherein the water discharge structure 5 comprises at least one first water outlet opening $6a_1$ in the first housing outer wall region 13, and at least one second water outlet opening $7_1$ in the second housing outer wall region 14. Optionally, the water discharge structure 5 additionally contains water-directing forming sections and/or housing wall structures on the inner side of the first and/or second housing outer wall region 13, 14 in order for it to be possible for water to be guided or discharged from remote positions in the interior of the charger housing to one of the water outlet openings $6a_1$, $7_1$ in the first and second housing outer wall region 13, 14, respectively. Via the at least one first or the at least one second water outlet opening $6a_1$, $7_1$, water which has entered the housing interior or has formed there can exit the charger housing to the outside if the charger housing is in the first or second use position G1, G2, respectively, since the water outlet openings $6a_1$, $7_1$ are situated in the in each case associated first and second housing outer wall region 13, 14, respectively, said housing outer wall regions being situated at the bottom in the respective use position G1, G2 of the charger housing and forming on the respective housing side 3, 4 an external wall region of the charger housing.

In corresponding embodiments, the water discharge structure 5, as in the example shown, has a plurality of first water outlet openings $6a_1$, $6a_2$, $6b_1$, $6b_2$, $6c_1$, $6d_1$ in the first housing outer wall region 13 and/or a plurality of second water outlet openings $7_1$, $7_2$, $7_3$ in the second housing outer wall region 14. In alternative embodiments, provision is made of only in each case one water outlet opening in the first and/or in the second housing outer wall region 13, 14.

Figure 2:
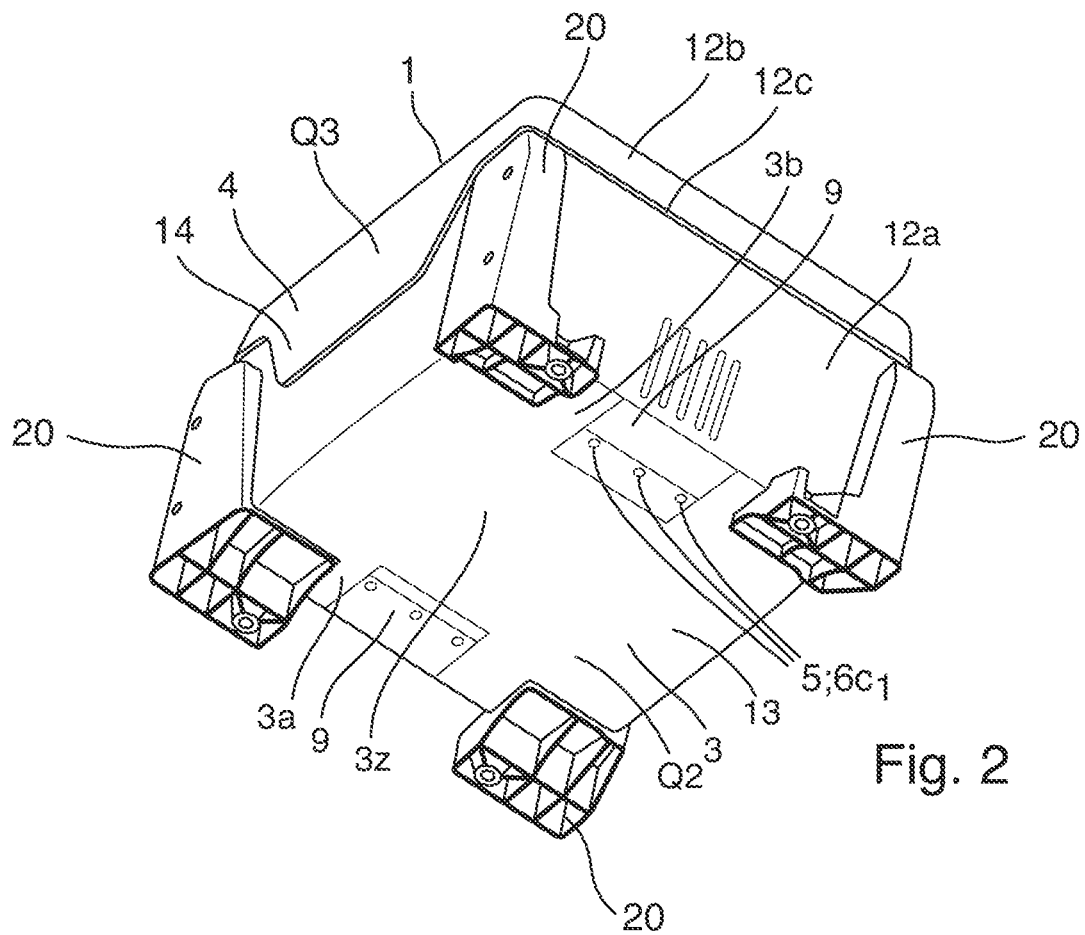
FIG. 2 shows a perspective view of the charger obliquely from below.
Figure 3:
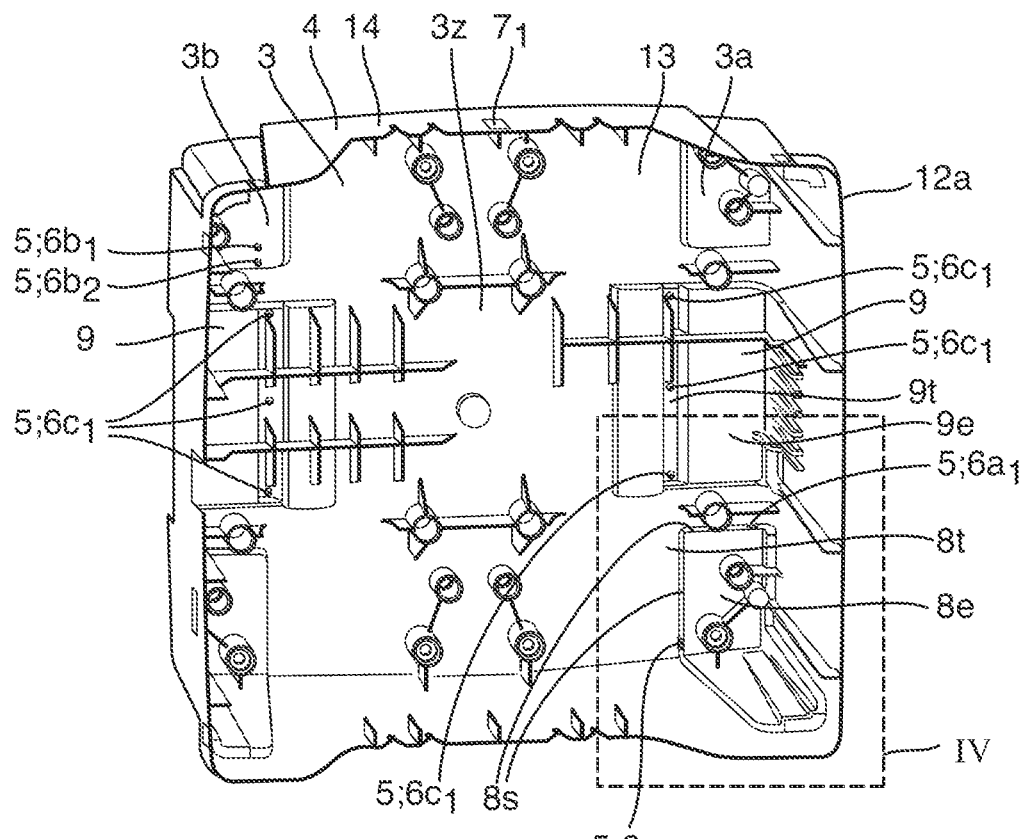
FIG. 3 shows a perspective view of a base housing shell of the charger housing.

In corresponding embodiments, the first housing outer wall region 13, as in the example shown, extends in a concavely descending manner from an elevated first central region $3z$ to at least one lower-lying first side edge region $3a$, in the example shown to two opposite first side edge regions $3a$, $3b$, as can be seen from FIGS. 2 and 3. The characterization elevated is to be understood here as meaning that the first central region $3z$ is situated at a higher level than the first side edge regions $3a$, $3b$ if the charger housing is in its associated first use position G1. The water discharge structure 5 contains at least one first water outlet opening $6a_1$, $6b_1$ in the respective lower-lying first side edge region $3a$, $3b$. In the example shown, in each of the two first side edge regions $3a$, $3b$, there are in each case multiple first water outlet openings $6a_1$, $6a_2$ and $6b_1$, $6b_2$, respectively, as can be seen for example from FIG. 3. In this way, owing to the slope present, water can, without any problems, flow away from the elevated first central region $3z$ to the lower-lying side edge region(s) $3a$, $3b$ and thus to the first water outlet opening(s) $6a_1$, $6a_2$, $6b_1$, $6b_2$ situated there, that is to say, by way of its descending wall course from the elevated first central region $3z$ to the lower-lying side edge regions $3a$, $3b$, the first housing outer wall region 13 forms a wall structure part of the water discharge structure 5.

Figure 4:
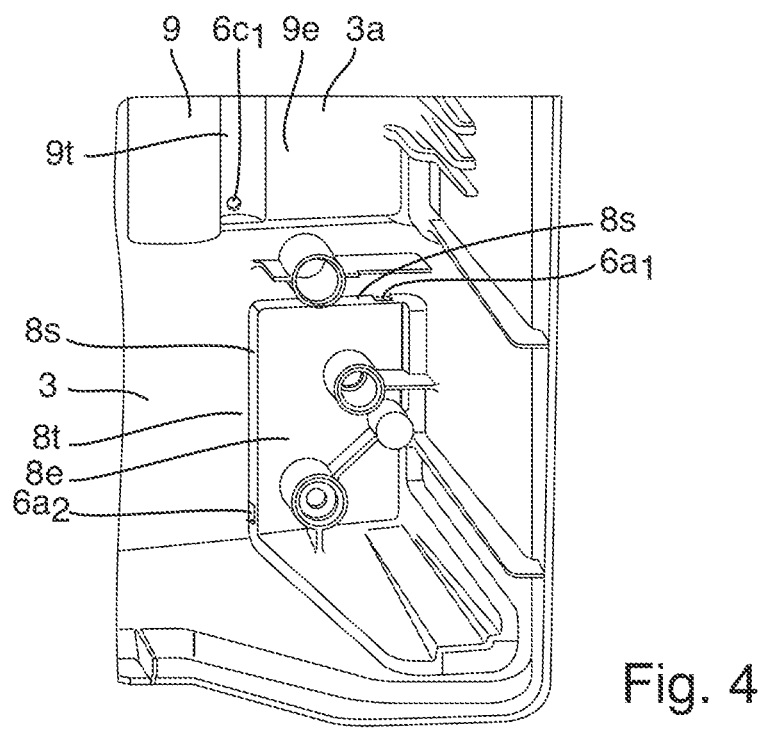
FIG. 4 shows a detail view of a region IV in FIG. 3.

In a specific realization, at least one first side edge region $3a$, in the example shown both first side edge regions $3a$, $3b$, has/have a wall section $8e$ which is elevated in relation to an adjoining lower-lying wall section $8t$, and the at least one first water outlet opening $6a_1$, in the example shown the first water outlet openings $6a_1$, $6a_2$, $6b_1$ and $6b_2$, is/are formed in a wall section $8s$ connecting the lower-lying wall section $8t$ to the elevated wall section $8e$, as can be seen specifically from FIGS. 3 and 4. Since the wall section $8s$ mediates between the wall sections $8t$ and $8e$, which are situated at different height levels, the wall surface thereof is generally oriented substantially vertically if the charger housing is in the associated first use position G1 on the substantially horizontal support 19 and adjoins the latter by way of its first housing side 3. This can protect the first water outlet opening(s) $6a_1$, $6a_2$, $6b_1$, $6b_2$ formed there from dirt entering from below.

In corresponding embodiments of the charger housing, at least one first side edge region $3a$ of the first housing outer wall region 13, in the example shown both first side edge regions $3a$, $3b$ thereof, has/have a grip depression zone 9 with an elevated grip zone section $9e$ and with a comparatively lower-lying grip zone section $9t$, and at least one first water outlet opening $6c_1$, in the example shown multiple first water outlet openings $6c_1$, is/are formed in the lower-lying grip zone section $9t$. In this way, the respective wall surface region of the first housing outer wall region 13 functions both as a structure part for forming the grip depression zone 9, which makes gripping and handling of the charger housing easier for the user, and as a water-discharging structure part of the water discharge structure 5 in that, there, water can flow away from the elevated grip zone section $9e$ to the lower-lying grip zone section $9t$ and, via the respective first water outlet opening $6c_1$ there, can exit the charger housing.

In corresponding embodiments, the respective battery charging space 2, as in the example shown, has a battery compartment housing 10 which is open towards the operating side 1, and the water discharge structure 5 contains at least one third water outlet opening $11_1$, which leads out of the battery compartment housing 10, in the example shown multiple third water outlet openings $11_1$, $11_2$, as can be seen in particular from FIGS. 5 and 6. In this way, water which has entered the battery compartment housing 10, for example via the operating side 1, or has formed as condensation water in the battery compartment housing 10 can flow out of the battery compartment housing 10. For this purpose, it may be advantageous if the at least one third water outlet opening $11_1$ is situated on a side of the battery compartment housing 10 that faces the first housing outer wall region 13 and/or on a side of the battery compartment housing 10 that faces the second housing outer wall region 14 of the charger housing, so that the respective side of the battery compartment housing 10 forms a compartment housing side which is situated at the bottom in the associated first or second use position G1, G2, respectively, of the charger housing. FIGS. 5 and 6 show the battery compartment housing 10 in the example shown with the third water outlet openings $11_1$, $11_2$ on that compartment housing side which forms the bottom side of the battery compartment housing 10 if the charger housing is in its first use position G1.

In an advantageous specific realization, the at least one third water outlet opening $11_1$ opens out, from a housing side $10a$ of the battery compartment housing 10 that is opposite the operating side 1, directly into an associated one of the one or more first or second water outlet openings. In the example shown, two third water outlet openings $11_1$ open out, from the battery compartment housing 10, directly into in each case one first water outlet opening $6d_1$ in the first housing side 3. In alternative realizations (not shown), at least one third water outlet opening opens out, from that housing side $10a$ of the battery compartment housing 10 which is opposite the operating side 1, directly into an associated second water outlet opening in the second housing outer wall region 14.

In a further advantageous, specific realization, at least one third water outlet opening $11_2$ opens out, from that housing side $10a$ of the battery compartment housing 10 which is opposite the operating side 1, into a housing interior 15 between the battery compartment housing 10, at one side, and the first or the second housing outer wall region 13, 14, at the other side. In the example shown, multiple third water outlet openings $11_2$ open out into the housing interior 15 between the battery compartment housing 10 and the first housing outer wall region 13 through a contact zone region 21 on said housing side $10a$ of the battery compartment housing 10. Said third water outlet openings $11_2$ may be formed for example by contact slot openings of the contact zone region 21, wherein the contact zone region 21 serves in a manner known per se for electrically connecting a battery unit inserted into the battery compartment housing 10 to an electrical charging part of the charger.

The position of the third water outlet openings $11_1$, $11_2$ on that housing side $10a$ of the battery compartment housing 10 which is opposite the operating side 1 is particularly advantageous if the operating side 1 of the charger housing is situated at the top of the charger housing in a corresponding use position, in the example shown the first use position G1. In this case, water which passes, for example from above via the operating side 1, into the battery compartment housing 10 can be downwardly directed, on the opposite housing side $10a$, out of the battery compartment housing 10 again.

Figure 8:
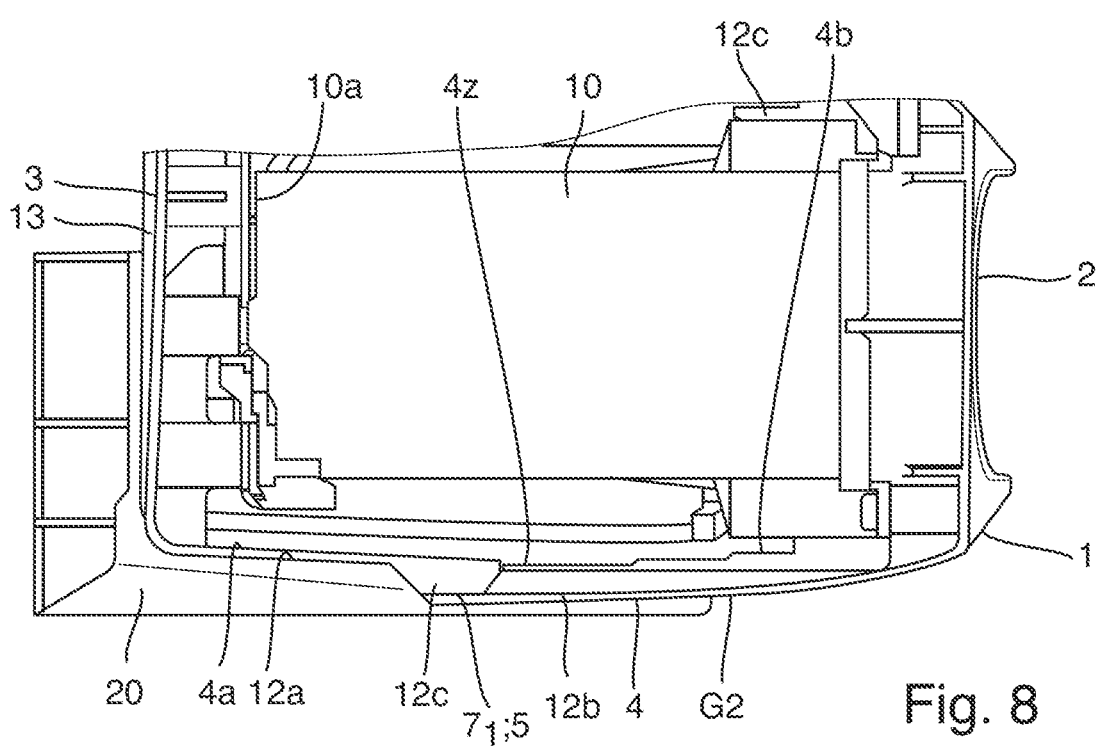
FIG. 8 shows a sectional view of the charger housing in the second use position in a longitudinal centre plane of the charger housing.

In corresponding embodiments of the charger housing, the second housing outer wall region 14 extends in a convexly descending manner from at least one elevated second side edge region $4a$, in the example shown from two opposite elevated second side edge regions $4a$, $4b$, to a lower-lying second central region $4z$, and at least one second water outlet opening $7_1$ is situated in the lower-lying second central region 4z. In this way, the second housing outer wall region 14 forms in the respective sub-region a housing wall-side structure part of the water discharge structure 5, with the aid of which structure part water can be directed from the higher-lying second side edge region(s) 4a, 4b to the lower-lying second central region 4z, so as, there, to be guided out of the charger housing via the second water outlet opening $7_1$, if the charger housing is in its second use position G2, as can be seen in particular from FIG. 8.

In corresponding realizations, the charger housing, as in the example shown, comprises a two-part housing shell having a base housing shell 12a and having a cover housing shell 12b, which is connected peripherally to said base housing shell, wherein the at least one second water outlet opening $7_1$ in the second housing outer wall region 14 contains a gap opening 17 between the two housing shells 12a, 12b.

Figure 10:
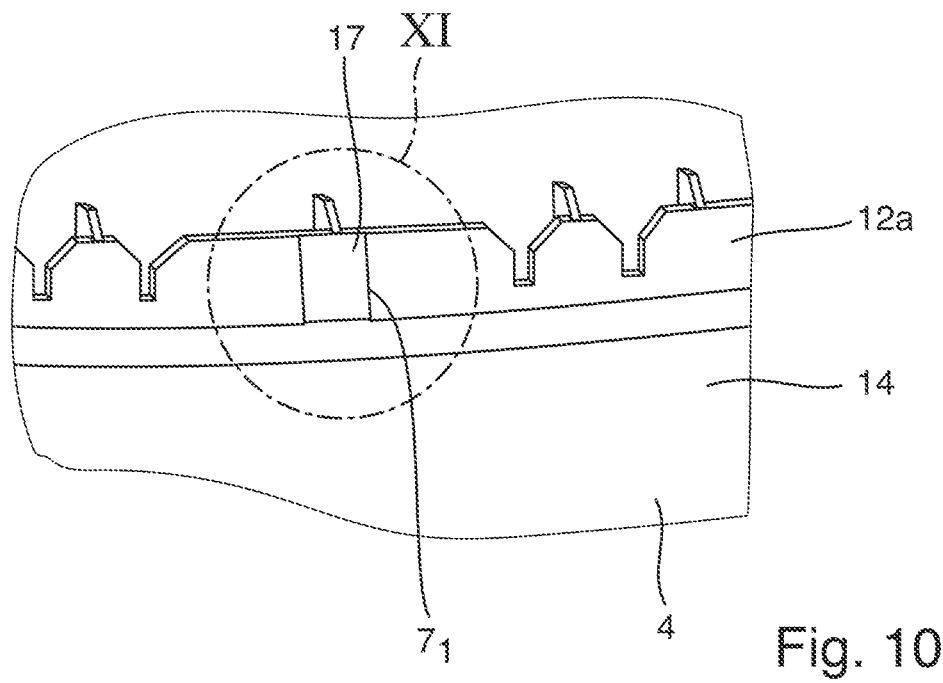
FIG. 10 shows a detail view of a region X in FIG. 9.
Figure 11:
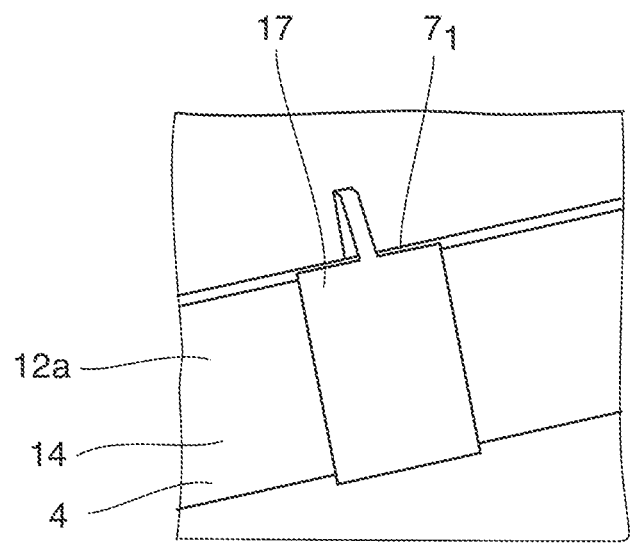
FIG. 11 shows a detail view of a region XI in FIG. 10.

In the example shown, the gap opening 17 is formed by an external groove in the wall region of the base housing shell 12a there, as can be seen in FIGS. 10 and 11. Said groove region is covered perpendicularly to the wall plane by the edge region of the cover housing shell 12b there, with the result that said gap opening 17 is formed between the wall sections of the two housing shells 12a, 12b there, said gap opening making it possible for water to be discharged there from the charger housing along the gap opening 17 parallel to the wall plane.

In corresponding realizations, multiple second water outlet openings $7_1$, $7_2$, $7_3$ are, as in the example shown, formed, spaced apart from one another, as a respective gap opening between the two housing shells 12a, 12b in the second housing outer wall region 14 and along a separation line 12c of the two housing shells 12a, 12b. In the example shown, a second water outlet opening $7_1$ is formed in the recessed central region 4z, and in each case one further second water outlet opening $7_2$, $7_3$ is formed in the two side regions of the second housing outer wall region 4, along the separation line 12c of the two housing shells 12a, 12b as a respective gap opening, as can be seen from FIG. 9.

In corresponding embodiments, the charger housing, as in the example shown, is of cuboidal form, with a first cuboid side Q1 as the operating side 1, a second cuboid side Q2, opposite the first cuboid side, as the first housing side 3, and a third cuboid side Q3, between the first and second cuboid sides Q1, Q2, as the second housing side 4. This constitutes a favourable design of the charger housing with regard to handling, functionality and fastening possibilities. During the use of the charger, the operating side 1 may advantageously be situated at the top, as in the first use position G1 as per FIG. 1, or at the front, as in the second use position G2 as per FIG. 7, and in this way be optimally accessible. At the same time, water outlet openings of the water discharge structure 5 are situated at favourable positions at the bottom of the charger housing both if the latter is in its first use position G1 and if it is in its second use position G2.

Figure 9:
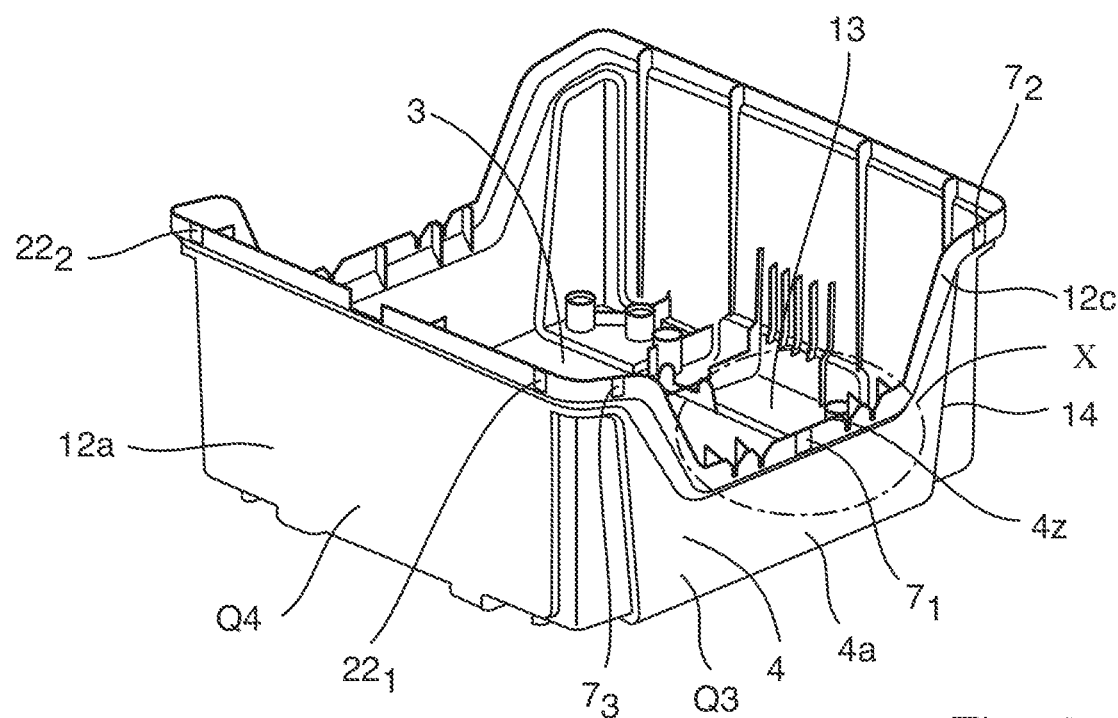
FIG. 9 shows a perspective view obliquely from above of the base housing shell of the charger housing.

According to requirement and application, the charger housing may have, in addition to the first and second housing outer wall regions 13, 14, which are situated on the first and second housing sides 3, 4, respectively, one or more further housing outer wall regions on a third housing side and possibly on one or more further housing sides, which, in corresponding further possible use positions of the charger housing, in each case form the bottom side thereof, wherein the water discharge structure 5 then additionally contains at least fourth and possibly further, fifth water outlet openings in each of these further housing outer wall regions. Thus, for example, it is possible for there to be formed, in corresponding modifications of the cuboidal charger housing shown, a cuboid side which is situated opposite the third cuboid side Q3, and/or a cuboid side between the first and second cuboid sides Q1, Q2 that is adjacent to the third cuboid side Q3, as such a further housing side with a corresponding further housing outer wall region in which in each case one or more further water outlet openings of the water discharge structure 5 are formed. In FIG. 9, this is represented by way of example and representatively for other possible realizations by two further, fourth water outlet openings $22_1$, $22_2$ on a cuboid side Q4 between the first and second cuboid sides Q1, Q2 that is adjacent to the third cuboid side Q3.

As the exemplary embodiments shown and discussed further above make clear, the invention makes available a charger and a corresponding charger housing with a highly advantageous configuration with regard to handling, variability of use, functionality and protection against moisture. The charger may be used in particular for electrical charging of battery packs and similar rechargeable battery units for hand-guided gardening and forestry tools and other electrically powered hand tools.

What is claimed is:

1. A charger housing, comprising:
   an operating side;
   at least one battery charging space, which is accessible from the operating side;
   a first housing outer wall region on a first housing side, said first housing side forming, in a first use position of the charger housing, a bottom side thereof;
   a water discharge structure for discharge of water out of the charger housing, wherein the water discharge structure contains at least one first water outlet opening in the first housing outer wall region; and
   a second housing outer wall region on a second housing side, said second housing side being non-parallel to the first housing side and forming, in a second use position of the charger housing, a bottom side thereof,
   wherein the water discharge structure comprises at least one second water outlet opening in the second housing outer wall region, and:
   (i) the first housing outer wall region extends in a concavely descending manner from an elevated first central region to at least one lower-lying first side edge region, and
   at least one of the one or more first water outlet openings is situated in the at least one lower-lying first side edge region, or
   (ii) the second housing outer wall region extends in a convexly descending manner from at least one elevated second side edge region to a lower-lying second central region, and
   at least one of the one or more second water outlet openings is situated in the lower-lying second central region.

2. The charger housing according to claim 1, wherein
   the at least one first side edge region has a wall section which is elevated in relation to an adjoining lower-lying wall section, and
   the at least one first water outlet opening there is situated in a wall section connecting the lower-lying wall section to the elevated wall section.

3. The charger housing according to claim 1, wherein
   the at least one first side edge region has a grip depression zone with an elevated grip zone section and with a comparatively lower-lying grip zone section, and
   at least one of the one or more first water outlet openings is situated in the lower-lying grip zone section.

4. The charger housing according to claim 1, wherein
the battery charging space has a battery compartment housing which is open towards the operating side, and
the water discharge structure contains at least one third water outlet opening, which leads out of the battery compartment housing.

5. The charger housing according to claim 4, wherein
the at least one third water outlet opening opens out, from a housing side of the battery compartment housing that is opposite the operating side, into a housing interior between the battery compartment housing and the first or the second housing outer wall region or directly into an associated one of the one or more first or second water outlet openings.

6. The charger housing according to claim 1, further comprising:
a two-part housing shell having a base housing shell and having a cover housing shell, which is connected peripherally to said base housing shell, wherein
at least one of the one of more second water outlet openings in the second housing outer wall region contains a gap opening between the base and cover housing shells.

7. The charger housing according to claim 6, wherein
multiple second water outlet openings in the second housing outer wall region contain a respective gap opening between the base and cover housing shells and are spaced apart from one another along a separation line of the base and cover housing shells.

8. A charger housing, comprising:
an operating side;
at least one battery charging space, which is accessible from the operating side;
a first housing outer wall region on a first housing side, said first housing side forming, in a first use position of the charger housing, a bottom side thereof;
a water discharge structure for discharge of water out of the charger housing, wherein the water discharge structure contains at least one first water outlet opening in the first housing outer wall region; and
a second housing outer wall region on a second housing side, said second housing side being non-parallel to the first housing side and forming, in a second use position of the charger housing, a bottom side thereof,
wherein the water discharge structure comprises at least one second water outlet opening in the second housing outer wall region,
wherein the charger housing is cuboidal,
a first cuboid side forms the operating side,
a second cuboid side, opposite the first cuboid side, forms the first housing side, and
a third cuboid side, between the first and second cuboid sides, forms the second housing side.

9. A charger for electrically charging a rechargeable battery unit, comprising:
a charger housing, said charger housing comprising:
an operating side;
at least one battery charging space, which is accessible from the operating side,
a first housing outer wall region on a first housing side, said first housing side forming, in a first use position of the charger housing, a bottom side thereof;
a water discharge structure for discharge of water out of the charger housing, wherein the water discharge structure contains at least one first water outlet opening in the first housing outer wall region; and
a second housing outer wall region on a second housing side, said second housing side being non-parallel to the first housing side and forming, in a second use position of the charger housing, a bottom side thereof,
wherein the water discharge structure comprises at least one second water outlet opening in the second housing outer wall region, and:
(i) the first housing outer wall region extends in a concavely descending manner from an elevated first central region to at least one lower-lying first side edge region, and
at least one of the one or more first water outlet openings is situated in the at least one lower-lying first side edge region, or
(ii) the second housing outer wall region extends in a convexly descending manner from at least one elevated second side edge region to a lower-lying second central region, and
at least one of the one or more second water outlet openings is situated in the lower-lying second central region.

\* \* \* \* \*